United States Patent [19]
Wilson

[11] 3,911,163
[45] Oct. 7, 1975

[54] SOLDER COATING PROCESS AND APPARATUS

[75] Inventor: Dennis L. Wilson, Mission Viejo, Calif.

[73] Assignee: Xerox Corporation, Stamford, Conn.

[22] Filed: Dec. 26, 1973

[21] Appl. No.: 428,652

[52] U.S. Cl. .................. 427/46; 427/49; 427/53; 427/55; 427/123
[51] Int. Cl.² ............................................. C23C 1/00
[58] Field of Search ...... 29/630 A, 630 D; 117/227, 117/231, 114 R; 118/421, 401; 228/56, 29, 30, 38, 41

[56] References Cited
UNITED STATES PATENTS
2,701,411  2/1955  Paine ............................. 29/630 D
3,478,878  11/1969  Swaisgood ....................... 117/114 R

*Primary Examiner*—Cameron K. Weiffenbach
*Assistant Examiner*—Ralph E. Varndell
*Attorney, Agent, or Firm*—James J. Ralabate; Franklyn C. Weiss; Anthony J. Sarli, Jr.

[57] ABSTRACT

Solder is applied to a series of individual pins or the pins installed in a connector block by filling the peripheral depressions of a gear-like wheel with a solder paste and rolling the gear across successive pins. As each pin extends into and contacts the solder paste, the pin or solder or both are heated to flow the solder.

8 Claims, 3 Drawing Figures

U.S. Patent  Oct. 7,1975  3,911,163

SOLDER COATING PROCESS AND APPARATUS

BACKGROUND OF THE INVENTION

1. Field of the Invention

This invention relates to a method for applying a metered quantity of solder to a selected location and more specifically to a method for applying a solder coating to individual pins or the pins installed in a connector block.

2. Description of the Prior Art

In the past, when it was desired to apply a fixed amount of solder to a pin or a series of pins, one method used was to place solder preforms on individual pins and reflowing the solder with infrared or similar sources of heat. This technique involved considerable time for placement of the preforms, particularly if the number of solder connections is large. Further, reflowing the solder sometimes would cause the solder to flow onto the connector body or the board or to disperse over the total length of the pin when it was desired to limit the soldered area to a small portion of the pin.

Other techniques involved painting or dipping the pins into a solder paste or paint and then heating the connector blocks or boards in ovens, by irons or by other means to flow the solder. It was found that the quantity of solder would vary from pin to pin when the painting technique was used and the paste tended to fall away from the pins before reflow could be accomplished.

Other techniques have been attempted but found inadequate for reasons of quality or cost.

It is an object, therefore, of the instant invention to provide a method and apparatus for applying a predetermined amount of solder to the individual pins or connect pins.

SUMMARY OF THE INVENTION

According to the instant invention, solder is applied to connector pins by filling depressions in a corrugated, gear-like wheel with solder paste, and rolling the wheel over the pins so that the pins extend into the solder in the depressions (the depressions spacings approximate the pin spacings) and finally causing a wetting of the pins by the solder through the use of direct or indirect heat in the pin area.

DESCRIPTION OF THE PREFERRED EMBODIMENT

Figure 1:
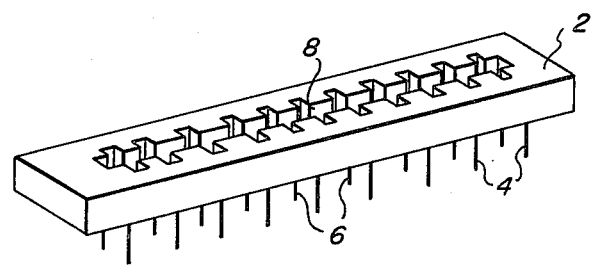
FIG. 1 shows a perspective view of a connector block to which solder is to be applied according to the invention.

FIG. 1 shows a connector block 2 with two rows of pins 4 and 6 extending from one side thereof. The opposite side of the connector block 2 has female connector members by which a plug device may be electrically connected to the pins 4 and 6.

Figure 2:
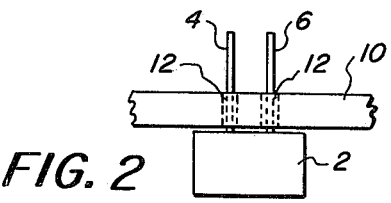
FIG. 2 is an end view of a connector block with the pins thereof extending through a back-plane or wire-wrap board.

FIG. 2 shows an end view of the connector block 2 and the rows of pins 4 and 6 extending through holes drilled in a back-plane board or a wire-wrap board. A coating of solder paste is shown surrounding a portion of each of the pins 4 and 6, and drawn down into the holes in the board.

Figure 3:
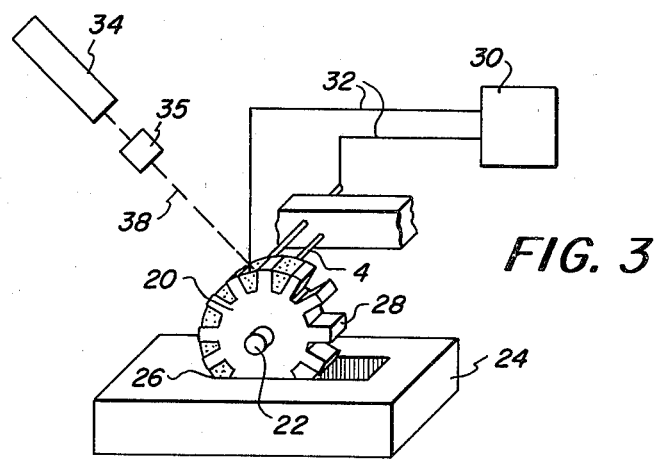
FIG. 3 shows apparatus for performing the method of the invention.

In FIG. 3 is shown in a gear-like corrugated wheel 20 which may be mounted for rotation on an axis shown at 22. The mounting means is not described for clarity of the illustration but the wheel may be rotatably mounted with any conventional means. A trough 24 is shown in proximity to the gear wheel 20, the trough may have an opening 26 which is slightly larger than the radius of the teeth of gear 20 which extends into the trough 24 to fill the depression between the gear teeth with a solder paste. A suitable solder paste for this application may be Kester Solder Paint Number 1, Alloy 63/37, Type resin RA, Mesh 200, or another suitable solder paste. As gear wheel 20 is rotated into the solder paste contained in trough 24, the edges 28 are wiped clean of the solder paste by the edge of the opening 26. The solder remains in the depression between gear teeth, however, in an amount which can be precisely controlled by varying the depression of the gear wheel and the spacing between the teeth. The spacing between the teeth, however, may conveniently be established to match the spacing between the pins desired to be solder coated. The width of the gear would be established as a function of the area of the pin desired to be covered with solder.

As the gear number 20 is rotated, the connector block 2 or individual pin carrier 10 carrying pins 4 is moved relatively close to the gear wheel by an appropriate fixture means not shown. The fixture may be such that the pins extend into the depression between the tooth of the gear wheel 20 so that the pins are in intimate contact with the solder carried between the gear teeth.

As the teeth come into contact with the solder the pins may be heated by, for example, a current generating means 30 connected to the pins by wires 32. Alternatively, the pins or the solder may be heated by induction heating, radio frequency heating, conduction, laser or impulse resistance heating. As the pin is heated by a desired technique, the solder is flowed and adheres to the pin.

One preferred method of heating the solder area is by use of a laser device shown diagrammatically at 34 with an associated focusing means 36 which projects a beam 38 upon the solder between the gear teeth. Since wiring pins are usually plated with a gold or other reflective material, laser light would be reflected by the pins. Thus, focusing the beam on the solder between the gear teeth offers an effective means of heating the solder area.

While the foregoing description has assumed that the pin would be heated at the time of contact with the solder, it is possible that, with the laser technique for example, it may be desirable to heat the solder to a semi-molten state slightly before coming into contact with the pin as well as during the period of contact.

While the invention has been described with reference to its preferred embodiment, it will be understood by those skilled in the art that various changes may be made and equivalents may be substituted for elements thereof without departing from the true spirit and scope of the invention.

What is claimed is:

1. A method for applying solder to a connector having a row of electrical connector pins by means of a gear with depressions between the teeth thereof comprising:
- a. filling the depressions between gear teeth with solder paste,
- b. locating one pin of said row of pins such that said one pin extends into one of said depressions,
- c. relatively moving said depressions and pins such that successive depressions and pins are contacted,
- d. applying heat to said pins substantially at the time of contact with said solder paste within said depressions.

2. A method as set forth in claim 1 in which said gear is non-metallic.

3. A method as set forth in claim 1 wherein said heat is applied by passing a current through said pin.

4. A method as set forth in claim 1 wherein said heat is applied by induction.

5. A method as set forth in claim 1 wherein said heat is applied by radio frequency generating means.

6. A method as set forth in claim 1 wherein said heat is applied by impulse resistance means.

7. A method as set forth in claim 1 wherein said heat is applied by laser beam.

8. A method as set forth in claim 1 wherein said heat is applied by conduction.

* * * * *